3,329,723
PROCESS FOR THE PREPARATION OF CYCLO-
HEXYL-PHENYL KETONE
Werner Muench, Barlassina, Francesco Siclari, Cesano Maderno, Giuliana Silvestri and Teresa Argenziano, Milan, and Roberto Iacuone, Cesano Maderno, Italy, assignors to Snia Viscosa Società Nazionale Industria Applicazioni Viscosa S.p.A., Milan, Italy, a company of Italy
No Drawing. Filed June 3, 1963, Ser. No. 284,816
Claims priority, application Italy, June 7, 1962,
Patent 669,771
5 Claims. (Cl. 260—591)

The present invention relates to a process for the production of cyclohexyl phenyl ketone which in recent times acquired considerable importance as a raw material for the preparation of caprolactam. (See U.S. Patent No. 3,022,291.)

Cyclohexyl-phenyl ketone is a mixed ketone in which the CO group is bonded both to a secondary carbon atom of a cycloaliphatic radical and to a phenyl radical. No methods are known so far permitting production exclusively of mixed ketones by processes that can be carried out on an industrial scale, and no processes are known so far permitting production of ketones in which the CO group is bonded to an originally secondary carbon atom, with yields allowing industrial realization and which must be therefore, quantitative.

For the production of ketones on an industrial scale in general the corresponding acids are used as starting material. For instance ketones are obtained by distilling the earth-alkaline salts of carboxylic acids. To produce mixed ketones a mixture of salts is used as starting material and in this case together with said mixed ketones there are always obtained the two corresponding symmetrical ketones (Houben-Weyl, 3rd edition, volume 3, page 530).

The attempt was made to produce in the same way also ketones in which the cyclohexyl radical is one of the radicals bonded to the carbonyl group. It is known in fact that by distilling barium acetate together with barium hexahydrobenzoate, cyclohexyl-methyl ketone is obtained in addition to dicyclohexyl ketone (Hell and Schaal, B. 40 (1907), page 463). If only barium hexahydrobenzoate is distilled, dicyclohexyl ketone is obtained.

As described in the literature, by both of the cited methods there are obtained only unsatisfactory yields and the research work carried out by applicants have confirmed that result (Hell and Schaal, B. 40 (1907), page 4164).

For the production of ketones, also other catalysts have been proposed, such as metallic iron, thorium oxide, manganese oxide etc. (Houben-Weyl, 4th edition, volume IV/2, page 430; Sabatier and Mailhe, C. 1914, page 1640; C.r. 158 (1914) pages 830–835; C.A. 1960, 1280[h]). As described in the literature, the ketones are obtained in the presence of those catalysts by passing thereover the vapours of one or two different carboxylic acids at temperatures between 400° C. and 500° C. Also by this method from two different carboxylic acids, all three possible ketones, are obtained. From carboxylic acids wherein the CO group is bonded to an originally secondary carbon atom, only low yields are obtained.

For the production of ketones containing a cyclohexyl radical adjacent to the carbonyl group, heretofore only laboratory methods have been available which for economic reasons are not appropriate for the industrial production of said ketones. Thus dicyclohexyl ketone is prepared by dehydrogenating the corresponding carbinol (C.A.24.4286; Beilstein VII 143) and mixed ketones containing the cyclohexylic ring bonded to the carbonyl group are prepared by reacting cyclohexyl mercury with a corresponding acid chloride, for instance benzoyl chloride (Beilstein, VII/II, 308) or by reacting a cyclohexylmagnesium halide (Grignard) with a carboxylic acid or its anhydride (C.A. 35,3980[1]). The most suitable method for the production of mixed ketones is still the Friedel-Crafts reaction. According to that method the chloride of hexahydrobenzoic acid is subjected to the reaction with an aromatic hydrocarbon, for instance with benzene, in the presence of aluminum chloride. The yields of ketones obtained by this method are high. However, the industrial realization is rather difficult owing to the high consumption of aluminum chloride and owing to the necessity of preparing the starting material, i.e. the acid chloride.

Now it has been found surprisingly that from a mixture of hexahydrobenzoic acid and benzoic acid it is possible to obtain very pure cyclohexyl-phenyl ketone in substantially quantitative yields, carrying out the ketonization in the presence of manganese (II) oxide dissolved in the mixture of the two acids.

It has been found indeed that manganese (II) oxide at a temperature beyond 200° C. easily dissolves in the mixture of the two acids with formation of water. Two moles of the mixture absorb up to 1 mole of manganese oxide ($MnO_2$) and a transparent and limpid fused mass is obtained. The quantity of manganese oxide in excess over the molar ratio is not dissolved by the acids and remains suspended in the mass. Since manganese oxide is absorbed by the mixture in stoichiometric amounts with formation of water, it may be supposed that after the dissolution of manganese oxide in the mixture the salts of the corresponding carboxylic acids are present, though those have not been analyzed or exactly determined.

Therefore the solutions of manganese oxide in the mixture of the acids will be called hereinafter manganese salts of the two acids.

In addition to the manganese salts that serve as catalysts, the molten mass may also contain some other metal oxides which under reaction conditions are substantially inert, but can form salts with the two acids. These metal oxides may bind a possible excess of mixture, forming the salts, and may cede the mixture again to the catalyst if a deficiency of it should occur. Suitable metal oxides are for instance magnesium oxide and lithium oxide.

To carry out the process, the manganese oxide dissolved in the mixture of the two acids, which moreover may contain other metal oxides, or the salts thereof formed with said acids, and manganese oxide in suspension, is heated to temperatures at which $CO_2$ is developed with simultaneous formation of ketone that begins to distil.

To the catalyst there is added, continuously or intermittently, a further quantity of mixture corresponding to that of the ketone formed. At the reaction temperature, the formation of the ketone proceeds regularly with simultaneous development of carbon dioxide and formation of water.

To obtain exclusively the mixed ketone, operation is carried out with a small molar excess of hexahydrobenzoic acid calculated on the benzoic acid. Said molar ratio should vary between 0.75 and 0.9 mole of benzoic acid for 1 mole of hexahydrobenzoic acid. The excess hexahydrobenzoic acid is found again unchanged in the distillate.

Operation can also be carried out with a greater excess of hexahydrobenzoic acid than indicated. This however does not provide any advantage. The distillate may contain, according to the operating method, also a small quantity of unchanged benzoic acid.

The temperature at which the mixed ketone is obtained, can vary within wide limits. Keeping the temperature of the molten mass which serves as a catalyst between about 280° C. and 420° C., the ketone formation is abundant.

If the operation is carried out at a temperature near to the lower limit, the ketone formation per unit of time however is comparatively low. Operating at a temperature close to or higher than the maximum limit, the catalyst becomes exhausted rather quickly and the ketone obtained is not very pure. The formation of the mixed ketone takes place with particular regularity at temperatures between 330° C. and 370° C.

The molar composition of the molten mass that serves as catalyst may vary within wide limits without any diminution of its activity. An efficient catalyst contains for instance 2 moles of a nearly equimolar mixture of hexahydrobenzoic acid and benzoic acid for about 1 mole of manganese (II). Particularly efficient catalysts contain in general for 2 moles of mixture of the acids a slightly greater amount than 1 mole of manganese (II), particularly an amount of 1.1 moles to 1.3 moles approximately. A catalyst of such composition is liquid at the reaction temperature and forms a molten mass containing manganese oxide in suspension.

If the operation is carried out with an excess of mixture of the acids, calculated on the totality of the metals present, the manganese dissolves completely and a transparent molten mass is obtained. The ketone formation takes place also if the whole manganese is dissolved in the molten mass, but the quantity of ketone formed is relatively small per unit of time. If the mixture of acids is diminished only a little in such a manner that in the molten mass are present somewhat less than 2 moles per 1 mole of manganese, a small quantity of manganese (II) oxide is separated, which remains suspended in the molten mass and the ketone formation proceeds very rapidly.

In general, at a constant temperature, a determined ratio between manganese oxide in suspension and manganese oxide dissolved in the molten mass, is obtained automatically. The quantity of manganese dissolved is determined by the quantity of mixture of acids which is present in the molten mass. At the temperatures from 330° C. to 370° C., which are preferably applied for the formation of the ketone, there is reached a ratio of about 1 mole of manganese per 1.6 to 1.9 moles of mixture of the acids.

Using the catalyst for a longer time its efficiency diminishes, which besides other facts becomes noticeable by a variation of the ratio between the manganese and the mixture of the acids, even if the temperature is kept constant. If, for instance, at a temperature of 345° C. the initially reached ratio was about 1.9 moles of mixture of the acids per 1 mole of manganese, the molar ratio after 24 hours' operation becomes about 1.5/1. The yield is still substantially quantitative, but the conversion diminishes and the ketones, which in the presence of fresh catalyst are colourless, assume little by little a yellow colour.

It is also possible to operate even from the beginning with an excess of manganese oxide considerably larger than that corresponding to the ratio of about 1.7 moles of mixture of the acids per 1 mole of manganese. Also in this case the ketone is initially obtained colourless, but it is more difficult to maintain constant for a long time the molar ratio between the mixture of the acids, and the manganese.

It has been found, and this forms too a part of the present invention, that is possible to keep the catalyst active for several weeks and to obtain regularly always a colourless ketone if the ketonization is carried out blowing steam into the reaction mass. It is possible to introduce steam directly into the molten mass that serves as a catalyst, or to evaporate the mixture of the acids by steam, thus introducing steam and the mixture of the acids simultaneously. In the presence of steam the ratio between the manganese and the acids present in the molten mass varies only a little even after a long period of operation. The preparation of the catalyst may be carried out in various manners. For instance, 2 moles of a mixture containing benzoic acid and hexahydrobenzoic acid in a molar ratio of 1:1 to 1:1.2, are slowly heated under stirring up to 280° C. together with 1.1 to 1.4 moles of manganese carbonate, firstly with a reflux condenser and then with a downward condenser, until the development of carbon dioxide and the formation of water have substantially ceased. In lieu of manganese carbonate, the corresponding quantity of manganese oxide may be employed, or the catalyst may be prepared even by double transposition of aqueous solutions of the salts of the two organic acids with manganese salts soluble in water.

If the ketonization is carried out in the presence of a metal oxide inert with respect to the reaction mixture, for instance in the presence of magnesium oxide, the catalyst is prepared by adding an amount of mixture of the acids equivalent to the quantity of magnesium oxide.

Also the production of cyclohexyl-phenyl ketone may be carried out by various methods; however at least a part of the manganese oxide should be present in any case as a salt of the two acids to be transformed. It is possible, for instance, to operate at normal pressure as well as under vacuum or at elevated pressure.

Also the mixture of hexahydrobenzoic acid and benzoic acid to be transformed into ketone can be introduced, by various methods, into the molten mass that serves as a catalyst. For instance, it is possible to introduce it into the stirred molten mass possibly blowing in continuously small amounts of steam.

In lieu of introducing the mixture of the acids continuously, it is possible also to add it in portions. Operating in that way, the temperature of the molten mass lowers at each addition in dependence on the quantity introduced, whereafter heating is continued until a quantity of ketone, equal to the quantity of mixture of the acids added is formed.

According to another method of operation, the molten mass of the catalyst is made to pass by means of a heated pump, through a tube kept at the reaction temperature and, the molten or evaporated acids are introduced at a suitable point of the apparatus.

The salts ought to derive from the bivalent form of manganese; therefore it is advisable to carry out the ketonization by introducing small quantities of hydrogen in order to avoid the oxidation of manganese (II) oxide.

Operating correctly there is obtained, surprisingly the mixed ketone only with a yield of more than 98% calculated on the reacted acids. The ketone obtained is sufficiently pure to be utilized for other purposes or chemical reactions, provided that the acids still present, do not interfere. If necessary it is possible to separate them by filtration or centrifugation, from the ketone, which crystallizes very well at room temperature.

The catalyst remains active for a long time, specially in the presence of steam, and the consumption of manganese (II), which can be regenerated by one of the known methods, is not higher than 0.1 to 1%, calculated on the ketone produced.

In the course of the reaction there are formed in the molten mass which serves as a catalyst, small quantities of resinous products that do not attain however the 0.1% calculated on the ketone formed.

By operating according to the same method, but replacing the manganese (II) by iron (II) or cadmium, also the mixed ketone is obtained, but the yields are not quantitative and vary between 40% and 85% of the theoretical yield calculated on the reaction mixture of the acids. Many resins and many secondary products are formed and the catalysts quickly become inactive.

The invention will be better understood by the following non-limiting examples.

*Example 1*

In a 2 litre flask, provided with a stirrer, thermometer, pipe for introduction of gas, dropping funnel and reflux condenser, there are mixed under stirring at 81° C., 524 g. of commercial manganese carbonate containing water (manganese content 42%=4 gram atoms) with 270 g. (2.2 moles) of hexahydrobenzoic acid and 210 g. (1.8 moles) of benzoic acid. The mixture is heated to 122° C. for the duration of 1 hour, and $CO_2$ and water are formed. The reflux condenser is replaced by a downward condenser. To the mass in the flask is slowly added a quantity of the acid mixture equal to that already charged and, while stirring, the temperature is elevated to 340° C. in two and a half hours' time.

At about 280° C. the formation of the ketone starts and becomes vivacious at about 340° C. At that time, the content of the flask weighs 1180 g. Heating is continued until the temperature reaches 345° C. and, under stirring, a fresh mixture of hexahydrobenzoic acid and benzoic acid (molar ratio of 1.22:1) molten by slight heating (81° C.), is added slowly by means of the dropping funnel passing simultaneously a slight stream of hydrogen through the reaction mass. While the water and the ketone distil, a regular stream of the $CO_2$ formed, together with the hydrogen, escapes. Introducing 340 g. of the mixture of acids per hour, into the reaction mixture a nearly colourless product distils regularly, which, slowly assumes a yellow colour if the operating time is extended.

To calculate the conversion and yield the reaction is interrupted after 24 hours. At that time the distillate containing water weighs 7335 g. In the flask remains a residue of 952 g. which with respect to the weight of 1180 g. found at the beginning of the ketone formation, indicates a diminution of 228 g. equal to 19.6%.

To separate the ketone, the distillate is diluted with ether. The acids contained in the distillate are extracted with a 10% aqueous solution of sodium carbonate and the aqueous layer is separated. After acidifying and subsequently distilling the crude mixture of the separated acids, there are obtained 1695 g. of mixture of pure acids, composed of 76.5% of hexahydrobenzoic acid and of 23.5% of benzoic acid, as approved by the refractometric test.

The organic layer is dried, the ether is eliminated and the residue is distilled at 0.1 mm. Hg. At the beginning (76 to 78° C.), cyclohexylphenyl ketone distils, which contains traces of dicyclohexyl ketone (refractometric test). At 80–81° C., pure cyclohexyl-phenyl ketone distils and finally (81–84° C.) cyclohexyl-phenyl ketone containing traces (0.2%) of benzophenone (refractometric test). There remains a residue of 24 g. partly formed by resins and partly by ketone. Totally there are obtained thus 5005 g. of cyclohexyl-phenyl ketone.

The mass remaining in the reaction vessel is heated with an excess of hydrochloric acid until the manganese has dissolved as chloride in water and the aqueous layer is separated from the organic layer which is treated as already described for the distillate.

There are obtained another quantity of 80 g. of cyclohexyl-phenyl ketone, 591 g. of the acid mixture containing hexahydrobenzoic acid and benzoic acid in the molar ratio 51.3:48.7%, and 26 g. of residue. Taking into account the introduced quantity of 9120 grammes of acids wherein are included also the 960 g. employed for the preparation of the catalyst, and the overall quantity of 2286 g. recovered, wherein are included the 591 g. recovered from the catalyst, the total yield of cyclohexyl-phenyl ketone is 5085 g., that is to say, 98.33% of the theoretical yield. The conversion of benzoic acid is calculated on the basis of the ratio between ketones deriving from benzoic acid, and the non-reacted benzoic acid contained in the distillate. The quantity of ketones 5005 g., contained in the distillate, corresponds to 3248 g. of benzoic acid in the distillate there are still 398 g. of non-reacted benzoic acid; the conversion of benzoic acid therefore is 87.5%.

If operation is carried out with the same quantities indicated above, but with a modified apparatus, introducing the mixture of the acids into the molten mass of the catalyst from below, instead of dripping it from above, and keeping the apparatus under a vacuum of 140 mm. Hg, the conversion increases by about 2.6% and, therefore, attains 90.1%. If the operation is carried out in an autoclave, closing it every time before proceeding with the introduction of the mixture of the acids, and opening it when the temperature has attained 340° C.—leaving it open until the $CO_2$ has completely escaped and the water and an amount of organic substance equivalent to that of the acids introduced are distilled off—there is obtained a conversion of the benzoic acid equal to 97% and a yield of ketone equal to 97% of the theoretical yield.

*Example 2*

As described in Example 1, 524 g. of commercial manganese carbonate (=4 moles of manganese) are mixed with 740 g. of hexahydrobenzoic acid (=5.78 moles) and 576 g. of benzoic acid (=4.72 moles) and heated slowly up to 280° C. Carbon dioxide and water are formed and a completely clear molten mass is obtained.

While the temperature is slowly raised up to 340° C. without adding any acid, there is formed a ketone with simultaneous development of $CO_2$. At 340° C. the formation of the ketone becomes more vivacious and, since MnO is separated that remains in suspension, the molten mass assumes a green colour.

Introduction of 47 g. per hour of steam into the molten mass is started. The temperature of the molten mass is raised to 345° C. and while maintaining this temperature, an overall amount of 9728 g. of the acid mixture (molar ratio 1.22:1) is introduced. Carbon dioxide is formed and ketone and water distil.

After having introduced an overall amount of 11044 g. of the acid mixture (containing 4946 g. of benzoic acid), the process is interrupted. The distillate and the mass that has remained in the reactor, are treated as described in Example 1.

From the distillate are recovered 2393 g. of the acid mixture and 5822 g. of cyclohexyl-phenyl ketone are obtained. From the mass that has remained in the reactor another quantity of 736 g. of the acid mixture and 65 g. of cyclohexyl-phenyl ketone are obtained.

The overall yield of cyclohexyl-phenyl ketone amounts to 5887 g., equal to 98.9% of the theoretical yield, taking into account of the 3129 g. of acids recovered. Owing to the presence of steam the colour of the molten mass that serves as catalyst even after 24 hours' operation, is much clearer compared to that of Example 1. In fact, after the normal treatment it appears that the content of resinous products is only about 10 grammes compared with the more than double amount that is obtained if operation is carried out according to Example 1. Also after a prolonged use and even for the duration of one week the catalyst keeps its full activity and the ketone distils substantially colourless. Moreover the loss of weight of the molten mass that serves as a catalyst is much smaller after, for instance 28 hours' operation.

In fact, the quantity of 1180 g. in the reactor at the beginning of the ketone formation diminishes to 1080 g. (9.6%) only, while the weight of the molten mass that serves as a catalyst diminishes by 20% after 24 hours only if operation is carried out without steam, as described in Example 1.

In this case the conversion of benzoic acid is slightly lower (85.1%), due to the fact that a part of the acid is drawn away by the steam before reacting.

*Example 3*

524 g. of commercial manganese carbonate (=4 moles of manganese) and 80.6 g. of magnesium oxide (2 moles) are mixed with 845 g. of hexahydrobenzoic acid (=6.6 moles) and 659 g. of benzoic acid (=5.4 moles) and a mixture is heated under stirring and refluxing for 1 hour to the temperature of 125° C. Carbon dioxide and water are formed. The reflux condenser is replaced by a downward condenser, 45 g. of steam per hour are passed through the molten mass formed which under stirring is heated slowly up to 340° C. in two and a half hours' time. 150 g. portions of a mixture fluidized by heating it to 81° C. containing hexahydrobenzoic acid and benzoic acid in a molar ratio of 1.2:1, are added. After every addition the temperature of the mass diminishes by about 35° C. In 15 minutes' time the temperature is restored to 340° C. Carbon dioxide develops and simultaneously water and ketone distil. In that way the process can be carried on for a long time.

After the interruption of the process, the reaction mixture and the residue in the flask are worked up as described in Example 1.

Taking into account the quantities of acids recovered, there is obtained a yield of cyclohexyl-phenyl ketone that is nearly quantitative and averages 99.5% of the theoretical yield.

The conversion of benzoic acid is slightly higher than that obtained by the tests carried out in the absence of magnesium oxide, and attains about 93% on an average.

We claim:

1. The method of producing mixed cyclohexyl phenyl ketone from a mixture of hexahydrobenzoic acid and benzoic acid, which consists in mixing hexahydrobenzoic acid and benzoic acid, in a molar ratio between 0.75 and 0.9 moles of benzoic acid for 1 mole of hexahydrobenzoic acid, with a catalyst selected from the group consisting of a metallic agent obtained by dissolving manganese oxide or manganese carbonate or a mixture of manganese carbonate with magnesium oxide in a mixture of hexahydrobenzoic acid and benzoic acid, or obtained by double transposition of aqueous solutions of the salts of hexahydrobenzoic and benzoic acids with manganese salts soluble in water, and heating the resultant mixture to dissolve said metallic agent in the mixture of acids, and then raising the temperature of said resultant mixture to a temperature between 280° C. and 420° C. to develop $CO_2$ and to produce said mixed ketone and water, and removing the ketone produced.

2. The method claimed in claim 1, wherein the mixture of acids and the metallic agent is heated first to at least 122° C. to effect dissolution of the metallic agent in the mixture of acids.

3. The method of claim 2 wherein there is present a molar ratio of 1.1 to 1.3 moles of manganese (II) to 2 moles of said mixture of acids.

4. The method of claim 1 wherein the metallic agent is a mixture of manganese carbonate and magnesium oxide, and this mixture with the acids is first heated to 125° C. to form carbon dioxide and water, then the mass is heated slowly up to 340° C., and a mixture of hexahydrobenzoic acid and benzoic acid is added to develop carbon dioxide, and simultaneously to distil water and said mixed ketone.

5. The method of claim 1, wherein the metallic agent is obtained by dissolving manganese oxide, in a mixture of hexahydrobenzoic and benzoic acids, and is mixed with said acids in an amount in excess of that which will dissolve completely in said acids so that some manganese oxide remains in suspension, and ketonization is continued by adding a further amount of the mixture of said acids while the manganese oxide is maintained in suspension.

References Cited

UNITED STATES PATENTS

| | | | |
|---|---|---|---|
| 1,315,525 | 9/1919 | Morton | 260—595 |
| 2,697,729 | 12/1954 | Ohlson et al. | 260—586 |
| 3,043,852 | 7/1962 | Mills | 260—595 |

LEON ZITVER, *Primary Examiner.*

DANIEL D. HORWITZ, *Assistant Examiner.*